Patented Sept. 5, 1950

2,521,022

UNITED STATES PATENT OFFICE 2,521,022

SYNTHETIC HYDROCARBON RESINS

Charles S. Rowland, Larchmont, N. Y., assignor to Interchemical Corporation, New York, N. Y., a corporation of Ohio No Drawing. Application May 31, 1946, Serial No. 673,622

4 Claims. (Cl. 260—82)

This invention relates to synthetic resins and particularly to such resins formed by the catalytic polymerization of the relatively low molecular weight heat polymers of the five-carbon diolefins obtainable from the cracking of hydrocarbon materials such as light oil, natural gas and petroleum.

Cyclopentadiene, one of the major constituents of the five-carbon olefin and diolefin fraction from the cracking of hydrocarbon material, can be polymerized by heat or it can be catalytically polymerized. In the catalytic polymerization of cyclopentadiene, the polymeric product usually obtained is a high molecular weight thermosetting resin generally believed to have a linear structure. Catalysts employed in such polymerization include acid-acting catalysts such as aluminum chloride, ferric chloride, and boron trifluoride. Heat polymers of cyclopentadiene are formed by heating the monomer at atmospheric pressure or preferably under superatmospheric pressure. These heat polymers consist of a mixture of unsaturated low molecular weight polymers containing for the most part dimers, trimers, tetramers, pentamers and hexamers of cyclopentadiene. Heat polymers which are copolymers of cyclopentadiene and one or more olefins and other diolefins are formed when mixtures of cyclopentadiene with olefins and other diolefins are heated. By heat alone, however, it has not been possible to obtain a high molecular weight cyclopentadiene polymer or copolymer.

I have now discovered that new high molecular weight polymers can be obtained by the catalytic polymerization of the relatively low molecular weight heat polymers and copolymers of cyclopentadiene. These new polymers are readily distinguishable from the known polymers formed by catalytic polymerization of monomeric cyclopentadiene in that the former are thermoplastic resins while the latter are thermosetting resins.

In the preparation of the novel thermoplastic resins of my invention I may catalytically polymerize dicyclopentadiene, tricyclopentadiene, or other relatively low molecular weight heat polymers of cyclopentadiene, or mixtures of these, or mixtures of any one or more of these heat polymers with codimers, cotrimers, etc., formed by heat polymerization of mixtures of cyclopentadiene with olefin and other diolefins.

Although I may use any of the starting materials stated hereinabove I prefer to use as the starting material a mixture of heat polymers obtained by heat polymerization of mixtures of cyclopentadiene with olefins and other diolefins, chiefly those containing five carbon atoms per molecule, such as pentenes, piperylene, and isoprene. It should be understood, however, that the use of such starting material is preferred merely because it is readily and economically available from commercial processes for cracking hydrocarbons such as light oil, natural gas and petroleum.

In the cracking of hydrocarbon substances such as natural gas, light oil and petroleum, a complex mixture consisting largely of olefins, diolefins and aromatics is obtained. By fractional distillation of this mixture, a fraction consisting for the most part of five-carbon olefins and diolefins such as pentenes, isoprene, piperylene, and cyclopentadiene, and minor amounts of the four and six-carbon olefins and diolefins can be obtained. Commercially, cyclopentadiene, which is a valuable polymerization monomer, can be separated from this mixture of C₅ olefins and diolefins by heating the mixture under such conditions of heat and pressure as to convert substantially all of the cyclopentadiene to polymeric form, chiefly dicyclopentadiene, without appreciably affecting the other unsaturated constituents thereof. Distillation of the lower boiling components of this partially polymerized mixture then gives a residue consisting largely of dicyclopentadiene and minor amounts of the dimers and codimers of other unsaturates in the original mixture together with minor amounts of higher polymers and copolymers of both cyclopentadiene and other unsaturates. Continued heating of this dicyclopentadiene concentrate at reflux, which temperature of course will be approximately the boiling point of dicyclopentadiene, results in depolymerization of substantially all of the dicyclopentadiene and distillation of the cyclopentadiene formed without appreciably effecting depolymerization of other dimers and codimers in the mixture. In fact some further heat polymerization of the other unsaturates in the mixture may occur during this depolymerization and distillation of the cyclopentadiene so as to give a still bottoms, after a major portion of the cyclopentadiene has been removed, which consists of low molecular weight heat polymers and copolymers of cyclopentadiene, isoprene, piperylene, and pentenes.

The bottoms referred to hereinabove as a by-product in the production of cyclopentadiene has, in the past, received little attention in the resin industry and has been considered largely as waste. I have now discovered, however, that this still bottoms constitutes a very economical source of the starting material for the preparation of the novel thermoplastic resins of my invention.

The nature of this still bottoms may vary considerably depending upon the process used to remove various constituents from it. In one commercial process from which such still bottoms can be obtained a mixture of the $C_5$ olefins and diolefins obtained in the cracking of hydrocarbon material is heat-dimerized, and the resulting product is concentrated by distillation of the more volatile undimerized constituents to a mixture containing about 70 per cent dicyclopentadiene and 30 per cent dimers, codimers and higher heat polymers and copolymers of pentenes, isoprene and piperylene and codimers and other heat polymers and copolymers of these substances with cyclopentadiene. Such a concentrate is commercially available as a source of cyclopentadiene or dicyclopentadiene. The still bottoms referred to hereinabove is derived by heating this 70 per cent concentrate approximately to the reflux temperature of dicyclopentadiene whereby depolymerization of a large portion of the dicyclopentadiene and distillation of cyclopentadiene from the concentrate are effected. The resulting still bottoms may then be used as a starting material for the preparation of the new thermoplastic resin of my invention. Obviously, the composition of the still bottoms will vary depending upon the efficiency of separating cyclopentadiene from the concentrate.

It should be pointed out, however, that I may use this bottoms no matter what the efficiency of removal of cyclopentadiene is. In fact I may use the 70 per cent concentrate without removing any of the cyclopentadiene. When I use the 70 per cent concentrate I prefer to heat the concentrate at total reflux for such time as to convert a substantial amount of the dimers and codimers contained therein to higher heat polymers and copolymers. In general it has not been practical to remove all of the cyclopentadiene from such a concentrate, hence, the still bottoms which remains will always contain some cyclopentadiene heat polymers either in the form of dimers, trimers, etc., of cyclopentadiene itself or of copolymers of cyclopentadiene with olefins and other diolefins in the mixture. Due to the inherent complexity of such a mixture it is difficult to establish a definite lower limit of cyclopentadiene heat polymer concentration in this bottoms which will give a mixture suitable for carrying out the invention. I have, however, successfully polymerized still bottoms from which a substantial proportion of cyclopentadiene has been separated by distillation.

The process by which these heat polymers are converted to useful hydrocarbon resins according to my invention consists of heating the heat polymers to suitable polymerizing temperatures in the presence of acid-acting catalysts and stopping the reaction after the desired degree of polymerization has been obtained.

For the purposes of this invention the term "acid-acting catalysts" refers to substances which in general catalyze vinyl polymerization and which, when reacted with water, yield acid solutions. Examples of such catalysts are aluminum chloride, boron trifluoride, iron halides, zinc halides, stannous chloride, ethyl sulfate, sulfuric acid, and the like. However, I prefer to use boron trifluoride advantageously, in the form of its diethyl ether complex, in an effective amount up to about 5 per cent as the catalyst in polymerizing the unsaturated hydrocarbon substances according to the process of the invention. Boron trifluoride is my preferred catalyst because it is more active than many of the other acid-acting catalysts such as stannous chloride or aluminum chloride. Also, boron trifluoride is easier to remove from the reaction product than any of the other commonly used acid-acting catalysts.

The term "suitable polymerizing temperatures" as used herein denotes temperatures at which polymerization will proceed rapidly enough to give a process of practical value. Such temperatures will vary depending upon the catalyst used since one catalyst may be more or less active than another. With boron trifluoride as the preferred catalyst the preferred temperature lies between about 160 and 250° C.

The length of time required to obtain the desired degree of polymerization will obviously vary and will depend for the most part on the type of catalyst used and the temperature at which the polymerization process is carried out. In general I prefer to carry the polymerization far enough to obtain a brittle solid resin which generally melts in the range of 70 to 200° C. These brittle solid resins formed by the process of the invention are unsaturated thermoplastic hydrocarbon resins, having iodine values in the range of about 200 to 240. They are soluble in such solvents as mineral spirits, benzene, carbon tetrachloride and drying oils and they are useful in the manufacture of air-drying finishes such as varnishes.

In order that the invention may be more fully understood, reference may be had to the following examples in which the parts are by weight and the still bottoms as used refers to the mixture of heat polymers obtained in the production of cyclopentadiene as hereinabove described:

*Example I*

To 300 parts of still bottoms were added 2.6 parts of boron trifluoride-ethyl ether complex containing 47% boron trifluoride. An exothermic reaction ensued causing a rise in temperature of up to 10° C. accompanied by a brownish black coloration. The temperature of the mixture was then raised to approximately 165° C. at which point a second slight exothermic reaction took place and the mixture commenced to reflux with the development of a purple solution. After heating the purple solution to 190–210° C. for about an hour, or until tests indicated that the resin at room temperature was a brittle green solid, the mixture was heated to 215–225° C. for about one hour while a stream of air was passed through the mixture. Following this operation, the product was allowed to cool. A brown, brittle thermoplastic resin, melting at 126–132° C. was obtained in about 90% yield.

The resin was soluble in mineral spirits, benzene, carbon tetrachloride and linseed oil. The passage of air through the reaction mixture aids in destruction of the catalyst as well as removal of unreacted material. Further purification methods may be used, such as washing with water or dilute alkali solutions and then water to remove traces of catalyst.

*Example II*

A procedure similar to that used in Example I was used to the green brittle resin stage. At this point, destruction of the catalyst was achieved by intermittent injection of steam into the hot fluid resin for a period of one-half hour to obtain the brown brittle resin in about 94% yield. A carbon and hydrogen analysis showed 90.09% carbon and 9.70% hydrogen, indicating a hydrocarbon resin of the empirical formula $C_5H_{6.5}$.

Example III

The procedure outlined in Example I was followed up to the point at which the green brittle resin was obtained; then the mixture was heated at 215–225° C. for about two hours. The melting point of the product was 96–116° C.

Example IV

To 300 parts of still bottoms were added 1.2 parts of boron trifluoride catalyst in the form of the boron trifluoride-diethyl ether complex containing 47% boron trifluoride. A slight exothermic reaction occurred with a rise in temperature of about 6–10° C., and was accompanied by a brownish black coloration. External heat was then applied until reflux commenced at approximately 160–170° C.; then the temperature was gradually raised to 190–210° C. and maintained until, on removal of a sample, a green brittle solid was obtained. The mixture was then heated to about 225° C. and held until a brown brittle solid at room temperature was obtained. The yield of resin was more than 90% and the melting point was 73–82° C.

Example V

The procedure was similar to Example IV except that after the green brittle resin stage was reached the mixture was heated for 2½ hours at 250° C. The yield of resin was 93%, and its melting point was 83–100° C.

Example VI

The procedure of Example IV was followed up to the green brittle resin stage; then the mixture was heated at about 225° C. for about 4 hours while carbon dioxide was bubbled through the mixture. The resin melted at 142–170° C. and was obtained in a yield of about 80%.

Example VII

A procedure similar to that of Example VI was used except that the heating was continued for 7 hours while air was bubbled through the mixture. The yield of resin of melting point 150–180° C. was about 74%.

In all the above examples, still bottoms as recovered from the cracking of dicyclopentadine and recovery of cyclopentadient was used. A typical analysis of such still bottoms is as follows:

Specific gravity at 25° C. _____ 0.976
Refractive index at 25° C. _____ 1.5157
Dicyclopentadient content _____ 13%
90% boiling range at 13–14 mm. ____ 62–145° C.
Iodine value (Wijs method) _____ 327

Example VIII

To 1400 parts of a 70% dicyclopentadiene concentrate were added 8 parts boron trifluoride catalyst as the born trifluoride-diethyl ether complex. Following a moderate initial exothermic reaction, the material was heated to 150–170° C. and maintained under reflux for three to four hours. The condenser was removed and an inert gas was introduced at 170–190° C. over a period of one to two hours. A brown, brittle solid was recovered in 90% yield. It had a melting point of 105–118° C. and was soluble in mineral spirits and linseed oil.

Example IX

To 800 parts of 44% crude dicyclopentadiene were added about 4 parts of 47% boron trifluoride-diethyl ether complex. After a slight exothermic reaction heat was applied until reflux commenced at approximately 165° C. The mixture was heated under reflux at 175–205° C. for about 3 hours, or until the product was a greenish black solid at room temperature. The mixture was then heated to about 225° C. and an inert gas passed through it until a test showed a brown brittle resin at room temperature. The product melted at 70–83° C. and was obtained in 93% yield.

Example X

To 147 parts of pure dicyclopentadiene (M. P. 32–33° C.) were added 1.3 parts of 47% boron trifluoride-ethyl ether complex. The material was heated to 155–165° C. and held for one to two hours. A black-green resin was present at this stage and was converted to a brown, brittle solid by heating to 175–190° C. for one hour, accompanied by the passage of carbon dioxide gas. The product was soluble in mineral spirits.

Example XI

To 20 parts of tricyclopentadiene (B. P. 136–138° C. at 11.5 mm.) was added 0.5% boron trifluoride as the ethyl ether complex. The mixture was heated to 150–160° C. and held there for one-half hour, followed by raising the temperature to 200° C. and the passage of carbon dioxide gas for one-half hour. A brown brittle product soluble in mineral spirits was obtained in the amount of 19 parts.

In general it has been found that the higher the concentration of cyclopentadiene heat polymer in the starting material, the more rapid will be the polymerization and hence the polymerization will be more difficult to control. In carrying out polymerizations of concentrated dicyclopentadiene mixtures or pure dicyclopentadiene and other heat polymers of cyclopentadiene I prefer to use milder conditions than when mixtures containing relatively low concentrations of cyclopentadiene are polymerized.

It will be noted that no special procedure is given in the examples for removing the boron trifluoride catalyst from the resin formed. That this catalyst can be effectively removed by heating at high temperature so that, by the time the polymerization has been carried to the desired stage, the catalyst will generally be completely decomposed and driven from the reaction mixture is a very desirable feature in the use thereof. The passage of gases such as air or carbon dioxide through the fluid mixture at high temperature also aids in decomposing and driving out the catalyst. It should also be pointed out in this connection that passing air through the reaction mixture at high temperature has a second effect in that it tends to lead to a more viscous or higher melting resin. This is probably due to the formation of oxygenated products as a result of oxygen combining at unsaturated groups in the resin.

When other types of acid-acting catalysts are used, such as sulfuric acid or aluminum chloride, these catalysts may be removed by any conventional manner as by washing the reaction product with water or dilute aqueous alkali.

From the examples, it is noted that the melting point of the resin obtained will depend on the particular procedure followed. In general long heating plus the passage of gases such as air or carbon dioxide through the mixture tends to produce resins having relatively high melting points while short heating times produce relatively low melting resins.

Although boron trifluoride in the form of its diethyl ether complex has been used in all the examples it is also possible to use other complexes of boron trifluoride, such as the complex with butyl ether, butyl alcohol, or acetic acid. The results obtained using these complexes are in general similar to the results obtained with the boron trifluoride-diethyl ether complex.

Catalyst concentration may vary over relatively wide ranges of from an effective amount up to 5% boron trifluoride based on the weight of still bottoms. I prefer to use, however, the quite narrow range of 0.2–0.5% and a temperature above 150° C. Catalyst concentrations below the preferred range tend to give a polymerization rate which is too slow to be of practical value while concentrations above the preferred range give a polymerization which is too rapid to be readily controlled.

The polymerization may also be carried out in an inert solvent for the final resin. For instance, a 50% solution of still bottoms in high boiling (180–220° C.) aromatic hydrocarbon solvent containing 1% boron trifluoride as the diethyl ether complex was refluxed at 174–181° C. for five hours to give a 55% conversion of the bottoms to the hard brittle type resin. Increasing the amount of catalyst to 5% and refluxing for 5 hours gave 80% conversion to a hard brittle resin melting at 105–110° C.

The brittle, thermoplastic hydrocarbon resins of our invention are useful in various types of resin compositions. Among the more important properties of these resins are compatibility and solubility in customary varnish vehicles and similar solvents, thermoplasticity, chemical inertness, moisture resistance and alkali resistance. The resins are especially useful in varnish compositions containing drying oils and the usual types of solvents such as petroleum spirits or aromatic hydrocarbon solvents. The resins are also useful in ink compositions.

Having now described my invention and several of its many modifications, I claim as my invention:

1. A thermoplastic resin having a melting point of 70° to 200° C. and an iodine number of 200 to 240, obtained by polymerizing a starting material consisting of the low molecular weight heat polymers resulting from the separation by distillation of the major proportion of the unpolymerized constituents from a heat-dimerized unsaturated C₅ hydrocarbon fraction consisting principally of pentenes, isoprene, piperylene, and cyclopentadiene, the diolefinic constituents of such fraction comprising the major proportion thereof, the polymerization being carried out at a temperature of above 150° C. in the presence of boron trifluoride catalyst.

2. A thermoplastic resin having a melting point of 70° to 200° C. and an iodine number of 200 to 240, obtained by polymerizing a starting material consisting of the residue resulting from the distillation, at approximately the boiling point of dicyclopentadiene, of a heat-dimerized unsaturated C₅ hydrocarbon fraction consisting principally of pentenes, isoprene, piperylene and cyclopentadiene, the diolefinic constituents of such fraction comprising the major proportion thereof, the polymerization being carried out at a temperature above 150° C. in the presence of boron trifluoride catalyst.

3. A thermoplastic resin having a melting point of 70° to 200° C. and an iodine number of 200 to 240, obtained by polymerizing a starting material consisting of the residue resulting from the distillation, at approximately the boiling point of dicyclopentadiene, of a heat-dimerized unsaturated C₅ hydrocarbon fraction consisting principally of pentenes, isoprene, piperylene and cyclopentadiene, the diolefinic constituents of such fraction comprising the major proportion thereof, the polymerization being carried out at a temperature above 150° C. in the presence of 0.2 to 0.5% boron trifluoride catalyst.

4. The resin as claimed in claim 2, which has been partially oxidized by the passage of an oxygen-containing gas therethrough subsequent to the catalytic polymerization.

CHARLES S. ROWLAND.

REFERENCES CITED

The following references are of record in the file of this patent:

UNITED STATES PATENTS

| Number | Name | Date |
|---|---|---|
| 2,067,073 | Carmody | Jan. 5, 1937 |
| 2,352,980 | Soday | July 4, 1944 |

OTHER REFERENCES

Ellis: "Chemistry of Synthetic Resins," pages 188 and 227, vol. I, Reinhold (1935).

Certificate of Correction

September 5, 1950

Patent No. 2,521,022

CHARLES S. ROWLAND

It is hereby certified that error appears in the printed specification of the above numbered patent requiring correction as follows:

Column 5, line 54, for "dicyclopentadine" read *dicyclopentadiene*; line 55, for "cyclopentadient" read *cyclopentadiene*; line 59, for "Dicyclopentadient" read *Dicyclopentadiene*; line 66, for the word "born" read *boron*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*